US005609722A

United States Patent [19]

Rodriguez et al.

[11] Patent Number: 5,609,722

[45] Date of Patent: Mar. 11, 1997

[54] DEINKING WASTEPAPER USING REACTION PRODUCTS OF EPOXIDIZED $C_{10}$–$C_{22}$ CARBOXYLIC ACIDS WITH ALKOXYLATED POLYOLS

[75] Inventors: José M. Rodriguez, Fort Mill, S.C.; Anthony B. Cook, Charlotte, N.C.; Gail M. Howell, Fort Mill, S.C.

[73] Assignee: Henkel Corporation, Plymouth Meeting, Pa.

[21] Appl. No.: 566,193

[22] Filed: Dec. 1, 1995

Related U.S. Application Data

[63] Continuation of Ser. No. 854,982, filed as PCT/US92/03379, Apr. 23, 1992, abandoned.

[51] Int. Cl.[6] ........................ D21C 5/02

[52] U.S. Cl. ........................ 162/5; 162/6; 162/8

[58] Field of Search ........................ 162/4, 5, 6, 8

[56] References Cited

U.S. PATENT DOCUMENTS

| | | | |
|---|---|---|---|
| 4,964,949 | 10/1990 | Hamaguchi et al. | 162/5 |
| 5,120,397 | 6/1992 | Urushibata et al. | 162/5 |

FOREIGN PATENT DOCUMENTS

| | | |
|---|---|---|
| 2093813 | 4/1992 | Canada . |
| 9111424 | 8/1991 | WIPO . |
| 9206240 | 4/1992 | WIPO . |

*Primary Examiner*—Donald E. Czaja
*Assistant Examiner*—Dean T. Nguyen
*Attorney, Agent, or Firm*—Ernest G. Szoke; Wayne C. Jaeschke; Real J. Grandmaison

[57] ABSTRACT

Wastepaper containing printing ink is refined in the presence of the reaction products of epoxidized derivatives of $C_{10}$–$C_{22}$ carboxylic acids with alkoxylated carbohydrate-derived polyols and the detached printing ink particles are subsequently removed from the paper stock suspensions by flotation or washing.

8 Claims, No Drawings

DEINKING WASTEPAPER USING REACTION PRODUCTS OF EPOXIDIZED $C_{10}$–$C_{22}$ CARBOXYLIC ACIDS WITH ALKOXYLATED POLYOLS

This application is a continuation, of application Ser No. 07/854,982, filed as PCT/US 92/03379, Apr. 23, 1992, now abandoned.

BACKGROUND OF THE INVENTION

1. Field of the Invention

This invention relates to a process for regenerating wastepaper, and more specifically to the use of deinking chemicals prepared by reaction of epoxidized derivatives of $C_{10}$–$C_{22}$ carboxylic acids with an alkoxylated polyhydroxy alcohol for the regeneration of wastepaper.

Today, wastepaper is used in large quantities for the production of, for example, newsprint and hygiene paper. Brightness and color are important quality features for papers of this type. To achieve this, the printing inks have to be removed from the printed wastepaper. This is normally done by deinking processes essentially comprising two steps, namely:

1. refining the wastepaper, i.e., fiberizing in water in the presence of the chemicals required for detachment of the printing ink particles, and
2. removal of the detached printing ink particles from the fiber suspension.

The second step can be carried out by washing or flotation (Ullmanns Encyclopaedie der technischen Chemie, 4th Edition. Vol. 17, pages 570–571 (1979)). In flotation, which utilizes the difference in wetability between printing inks and paper fibers, air is forced or drawn through the fiber suspension. Small air bubbles attach themselves to the printing ink particles and form a froth at the surface of the water which is removed.

The deinking of wastepaper is normally carried out at alkaline pH values in the presence of alkali metal hydroxides, alkali metal silicates, oxidative bleaches and surfactants at temperatures in the range from 30° to 50° C. Anionic and/or nonionic surfactants, for example soaps, ethoxylated fatty alcohols and/or ethoxylated alkyl phenols are mainly used as surfactants (Wochenblatt fuer Papierfabrikation 17, 646 to 649 (1985))

2. Discussion of Related Art

DE-OS 31 01 444 relates to a process for the deinking of wastepaper using a compound corresponding to the following general formula

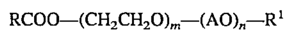

$$RCOO—(CH_2CH_2O)_m—(AO)_n—R^1$$

in which R is a $C_{7-21}$ alkyl or alkenyl group, $R^1$ is a hydrogen atom or a $C_{1-18}$ alkyl, alkenyl or acyl group, AO represents $C_3H_6O$ and $C_4H_8O$ groups or a mixture of $C_2H_4O$, $C_3H_6O$ and $C_4H_8O$ groups, m is an integer of 1 to 100 and n is an integer of 1 to 100.

The use of ethoxylated castor oils for the deinking of printed wastepaper is known, for example, from JP 78/52705, reported in Chem. Abstr. 89, 131445j (1978), and from DE 21 48 590. The Japanese patent describes mixtures of castor oil with 10 to 400% ethylene oxide and ethoxylated nonylphenol which are suitable for the removal of printing inks from printed wastepaper. The process disclosed in DE-PS 21 48 590 is concerned with organic materials, for example paper, which are bleached with sodium chlorite in the presence of organic compounds containing at least one ethylene oxide and/or propylene oxide unit. Suitable organic compounds containing at least one alkylene oxide unit include inter alia ethoxylated castor oil.

Where ethoxylated castor oils are used, however, it has to be accepted that the quantities of castor oil and, hence, ethoxylated castor oils available on the market are subject to considerable fluctuations. Poor harvests in the main areas of cultivation, namely Brazil and India, result in shortages of the starting material, castor oil, at more or less long intervals. Accordingly, there is a need for a substitute for ethoxylated castor oils which, when used in processes for the regeneration of wastepaper, are at least comparable with the product to be replaced in regard to the deinking results obtained. Above all, the substitute product should be obtainable from a broader raw material base less vulnerable to crises and should be both ecologically and toxicologically safe.

Further, DE 39 23 393 discloses a process for regenerating wastepaper containing printing ink using an alkoxylation product of a $C_{10}$–$C_{22}$ carboxylic acid or derivative thereof containing an OH group in one or more of the 9, 10, 13 and 14 positions on the carboxylic acid moiety. The alkoxylation product is obtained by epoxidizing unsaturated $C_{10}$–$C_{22}$ carboxylic acids or derivatives thereof, the oxirane ring of the epoxide is then opened by reaction with hydrogen or a protic compound to form hydroxy groups, and this material is then alkoxylated to the final product.

Also, Japan 291952/88 (equivalent to European patent application number 89311550.1) is directed to a deinking composition comprising a reaction product obtained by reacting a glyceride mixture derived from neutral oil and fat with ethylene oxide and propylene oxide. The glyceride mixture contains 5 to 10%/wt of monoglycerides, 30 to 45%/wt of diglycerides, and 50 to 70%/wt of triglycerides. The reaction product has a molar ratio of ethylene oxide to propylene oxide of between 1.8 to 2.2 wherein the mole number of added ethylene oxide is between 30 and 80 per mole of glycerides.

In addition, German patent application 40 32 050.2 filed Oct. 9, 1990 relates to regenerating printed wastepaper using the reaction product of alkoxylated aliphatic alcohols, amines, carboxylic acids, and carboxylic amides with epoxidized triglycerides such as $C_{10}$–$C_{22}$ carboxylic acid derivatives.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that epoxidized derivatives of $C_{10}$–$C_{22}$ carboxylic acids which are reacted with alkoxylated polyhydroxy alcohols are eminently suitable in processes for the deinking and regeneration of printed wastepaper.

Accordingly, the present invention relates to a process for the regeneration of wastepaper wherein printed wastepaper is refined in known manner in the presence of deinking compounds obtained by reaction of epoxidized derivatives of $C_{10}$–$C_{22}$ carboxylic acids with alkoxylated polyhydroxy alcohols, and the printing ink particles are subsequently removed from the fiber suspensions in known manner by flotation and/or washing.

The epoxidized derivatives of $C_{10}$–$C_{22}$ carboxylic acids employed as reactants for the preparation of the deinking compounds according to the invention are obtained by epoxidation of derivatives of unsaturated $C_{10}$–$C_{22}$ carboxylic acids. According to the process described in German Patent Specification (DE-PS) 857 364, unsaturated carboxylic acid derivatives can be epoxidized by reaction with peracetic acid in the presence of acidic catalysts or with performic acid formed in situ from formic acid and hydrogen peroxide. The iodine values of the resulting epoxidation products are below 20, and preferably below 15. Suitable unsaturated carboxylic acid derivatives include all naturally occurring or synthetically preparable carboxylic acid derivatives which are free from OH groups and contain carboxylic acid moieties with at least 1 or 2 double bond(s) in the 9-and/or 13-positions, for example 9c-dodecenoic acid, 9c-tetradecenoic acid, 9c-hexadecenoic acid, 9c-octadecenoic acid, 9t-octadecenoic acid, 9c,12c-octadecadienoic acid, 9c,12c,15c-octadecatrienoic acid, 9c-eicosenoic acid and/or 13c-eicosenoic acid derivatives, and/or mixtures thereof having at least a high content of such unsaturated carboxylic acid derivatives. Unsaturated carboxylic acid derivatives containing $C_{16}$–$C_{22}$ -carboxylic acid moieties having at least 1 or 2 double bond(s) in the 9- and/or 13-positions are preferred. Suitable unsaturated carboxylic acid derivatives are, for example, unsaturated carboxylic acid esters, unsaturated carboxylic acid amides, unsaturated carboxylic acid mono- and/or di-$C_{1-4}$ alkylamides and/or unsaturated carboxylic acid mono- and/or di-$C_{1-4}$ alkanolamides. Unsaturated carboxylic acid alkyl esters having from 1 to 18 carbon atoms in the monohydric alcohol moiety and/or mono-, di- and/or triglycerides containing carboxylic acid moieties having at least 1 or 2 double bond(s) in the 9- and/or 13-positions are preferred.

Examples of unsaturated $C_{10}$–$C_{22}$ carboxylic acid $C_1$–$C_{18}$ alkyl esters which are accessible in a per se known manner by esterifying the corresponding OH-group-free unsaturated carboxylic acids or by transesterification of the respective mono-, di- and/or tri-glycerides with $C_1$–$C_{18}$-alkyl alcohols such as, for example, methanol, ethanol, propanol, butanol, isobutanol, 2-ethylhexanol, decanol and/or stearyl alcohol include palmitoleic acid methyl ester, oleic acid methyl ester, oleic acid ethyl ester, oleic acid isobutyl ester, oleic acid 2-ethylhexyl ester, oleic acid decyl ester, and $C_{10}$–$C_{22}$ carboxylic acid $C_1$–$C_{18}$-alkyl ester mixtures having at least a high content of such $C_{10}$–$C_{22}$ carboxylic acid $C_1$–$C_{18}$ alkyl esters which have at least 1 or 2 double bond(s) in the 9- and/or 13-positions such as palm fatty acid methyl ester, soybean fatty acid methyl ester, soybean fatty acid 2-ethylhexyl ester, rapeseed fatty acid methyl ester and/or tallow fatty acid ethyl ester. As the mono-, di- and/or tri-glycerides containing $C_{10}$–$C_{22}$ carboxylic acid moieties which are unsaturated and free from OH groups and have at least 1 or 2 double bond(s) in the 9- and/or 13-positions, especially suitable are fats and/or oils of natural origin, the carboxylic acid contents of which are predominantly composed of unsaturated $C_{10}$–$C_{22}$ -carboxylic acids which have at least 1 or 2 double bond(s) in the 9- and/or 13-positions, preferably predominantly of unsaturated $C_{16}$–$C_{22}$ -carboxylic acids which have at least 1 or 2 double bond(s) in the 9- and/or 13-positions, such as olive oil, linseed oil, sunflower oil, safflower oil, soybean oil, peanut oil, cottonseed oil, rapeseed oil which is rich in erucic acid and/or low in erucic acid, palm oil, lard and/or tallow.

Examples of alkoxylated polyhydroxy alcohols include the alkoxylation products of glycol, glycerol, "neo" polyols such as trimethylolpropane, trimethylolethane, pentaerythritol, and polymers of the latter, and carbohydrate-derived polyols such as sorbitol, mannitol, etc.

Ethoxylated sorbitol is a preferred alkoxylated sugar alcohol for reaction with epoxidized derivatives of $C_{10}$–$C_{22}$ carboxylic acids to obtain the deinking chemicals in accordance with this invention.

The polyhydroxy alcohols are alkoxylated by known industrial methods, preferably with ethylene oxide, propylene oxide and/or butylene oxide and more preferably with ethylene oxide and/or propylene oxide, optionally in the presence of catalysts, for example potassium hydroxide and/or sodium methylate, at temperatures of 110° to 200° C. and preferably at temperatures of 140° to 175° C. and under pressures of $10^5$ to $2 \cdot 10^6$ Pa (Cf. for example "Chemische Technologie", Vol. 7 pages 131 to 132, Carl-Hanser-Verlag, München/Wein (1986)). The alkylene oxide content of the alkoxylated polyhydroxy alcohols is from 4 to 600%, and is preferably from 40 to 120%, based on the non-alkoxylated compounds.

The reaction products of epoxidized derivatives of $C_{10-C22}$ carboxylic acids with alkoxylated polyhydroxy alcohols are used in accordance with this invention by addition to paper stock suspensions in quantities of preferably 0.01 to 5% by weight and, more preferably, 0.1 to 0.8% by weight, based on air dry paper stock. Air-dry paper stock means that an equilibrium state of internal moisture has established itself in the paper stock. This equilibrium state depends both on the temperature and on the relative humidity of the air.

In many cases, the deinking result, i.e., the removal of printing inks from printed wastepaper, can be improved by using the deinking chemicals of this invention in combination with, for example, $C_{10}$–$C_{22}$ fatty acids such as Olinor® 4300, Olinor® 4010, and/or Olinor® 4020 (all products of Henkel Corporation), a soap, ethoxylated $C_6$–$C_{22}$ fatty alcohols, ethoxylated alkylphenols, polymers such as polyacrylamides and/or polydimethylaminoethyl methacrylic acid, and/or copolymers of the type described, for example, in DE 38 39 479. The total quantity of these optional constituents is between 0.01 and 5% by weight, based on air-dry paper stock.

In the presence of the deinking chemicals according to this invention, water-dilutable and/or solvent-containing printing inks, and/or solvent free inks, especially water-dilutable printing inks, for example rotary newsprint inks, book printing inks, offset printing inks, illustration intaglio printing inks, flexographic printing inks, laser printing inks and/or packaging intaglio printing inks, and/or xerographic inks may be removed from printed wastepaper, for example newspapers, magazines, computer paper, journals, brochures, forms, telephone directories and/or catalogues. The deinked wastepaper obtained is distinguished by very high degrees of whiteness.

Printed wastepaper is refined in a pulper at 20° C. to 80° C. at a pulp concentration of, for example, 1 to 30% by weight in an aqueous solution typically containing 0 to 2.0% by weight 100% hydrogen peroxide, 0 to 2.5% by weight NaOH, 0 to 4.0% by weight soda waterglass (silicate) having a solids content of about 35% by weight (37 to 40° Be), 0.01 to 5% by weight reaction products of epoxidized derivatives of $C_{10}$–$C_{22}$ carboxylic acids with alkoxylated polyhydroxy alcohols according to the invention, and 0 to 1% by weight of the optional constituents mentioned above (all percentages by weight based on air-dry wastepaper). After a residence time of 60 to 120 minutes at temperatures in the range from 20° C. to 80° C., the paper stock suspensions are stirred into water or water is added to them so that 0.6 to 1.6% by weight stock suspensions are obtained. The detached printing ink particles are then removed from the stock suspensions in known manner by washing out or by flotation (Ullmanns Enzyklopädic der technischen Chemie, 4th Edition. Vol. 17, pages 570 to 571 (1979)). Flotation is preferably carried out in known manner, for example in a Denver flotation cell.

EXAMPLE I

To about 225 grams of ethoxylated sorbitol (40 moles of ethylene oxide per mole of sorbitol) heated to a temperature of about 160° C. was added about 100 grams of soybean oil epoxide. The soybean oil epoxide had a fatty acid composition of about 11.5% palmitic acid, 4.0% stearic acid, 24.5% oleic acid, 53% linoleic acid, and 7.0% linolenic acid; an epoxide content of about 7% by weight; an iodine value of about 0.8; and an acid value of about 0.3. The mixture was reacted under a nitrogen gas purge at a temperature of about 200° C. After about two hours, the reaction temperature was increased to about 230° C., and about 0.32 gram of p-toluenesulfonic acid was added to the reaction mixture. After about three hours, the reaction was stopped. The product was found to have a residual oxirane content of about 0.20.

EXAMPLE II

About 100 grams of soybean oil epoxide were blended with about 225 grams of ethoxylated sorbitol (60 moles of ethylene oxide per mole of sorbitol) in a reaction flask. The soybean oil epoxide had a fatty acid composition of about 11.5% palmitic acid, 4.0% stearic acid, 24.5% oleic acid, 53% linoleic and 7.0% linolenic acid; an epoxide content of about 7.0% by weight; an iodine value of about 0.8; and an acid value of about 0.3.

The mixture was heated to about 230° C. for about 4 hours under a nitrogen sparge. The resultant product was found to have a residual oxirane content of about 0.18%.

EXAMPLE III

About 100 grams of linseed oil epoxide were blended with about 270.25 grams of ethoxylated sorbitol (40 moles of ethylene oxide per mole of sorbitol) in a reaction flask. The linseed oil epoxide had a fatty acid composition of about 6% palmitic acid, 3.5% stearic acid, 20% oleic acid, 14.5% linoleic acid and 56% linolenic acid. The linseed oil epoxide had an oxirane content of about 9.0% by weight; an iodine value of about 3.42; and an acid value of about 0.19. The mixture was heated to about 230° C. for about 10 hours under a nitrogen purge. The product was found to have a residual oxirane content of about 0.51%.

EXAMPLE IV

The products of Example I, II and III were evaluated for brightness gain, filler loss, fiber loss and total loss, and the values obtained were compared with those obtained using the deinking compositions of German Patent 39 23 393 and Japan Patent 291952/88. In this procedure, 100 gams of air-dry (=94 grams bone-dry at about 10% relative humidity) printed wastepaper consisting of about 50%/wt magazines and about 50%/wt newspapers were refined with an aqueous solution containing 0.7%/wt of sodium waterglass, 37 to 40° Be (35% by weight), 1%/wt of sodium hydroxide (99% by weight), 0.7%/wt hydrogen peroxide (100% by weight), and 0.2% or 2.0 grams of the reaction product of Examples I to III in a laboratory pulper (pulp consistency 22% by weight) for 15 minutes at 45° C. and then placing the pulp suspension into a disperger rotating at 2,000 revolutions per minute and, after 5 minutes at 45° C., were diluted to 1% by weight by stirring the stock suspension into water. A sample of the stock suspension was taken to form a pre-float pad. The stock suspension was then floated for 8 minutes at 45° C. in a Denver flotation cell at 1500 revolutions per minute and another sample of the stock suspension was taken to form a final pad. The stock suspension samples were separated from the water on a Coors porcelain funnel and shaped into a sheet between two filter papers on a vacuum drying press and dried for 5 minutes.

The deinkability value (Brightness Gain) was calculated by subtracting the average brightness of the pre-float suspension pad from the average brightness of the after-float suspension pad according to the following formula:

A=Average of 8 readings on the pre-float suspension pad.

B=Average of 8 readings on the after-float suspension pad.

Brightness Gain=A–B

The results of these evaluations are summarized in the following Table 1.

| Reaction Product Used | Quantity of RXN Product Used | Brightness Gain | % Filler Loss | % Fiber Loss | % Total Loss |
|---|---|---|---|---|---|
| Blank | 0.2% | –2.0 | 6.2 | 1.9 | 2.4 |
| Example I | 0.2% | 5.8 | 15.9 | 5.6 | 6.8 |
| Example II | 0.2% | 4.6 | 24.2 | 7.2 | 9.3 |
| Example III | 0.2% | 3.6 | 21.1 | 6.1 | 7.8 |
| De 39 23 393 | 0.2% | 4.1 | 16.8 | 5.0 | 6.3 |
| Japan 29 1952/88 | 0.2% | 4.9 | 13.2 | 3.9 | 4.9 |

What is claimed is:

1. The process of regenerating wastepaper containing printing ink comprising the steps of:

A. fiberizing said wastepaper in an aqueous deinking solution containing from about 0.01% to about 5% by weight, based on the weight of air-dry wastepaper of the reaction products of about 1 part by weight of an epoxidized mono-, di- or triglyceride containing unsaturated $C_{10}$–$C_{22}$ carboxylic acids moieties having an epoxide content of about 7% by weight and which are free from OH groups and have at least 1 or 2 double bond(s) in the 9- or 13- position with about 2 Parts by weight of an alkoxylated carbohydrate-derived polyol selected from the group consisting of sorbitol and mannitol containing from about 4% to about 600% by weight of alkylene oxide to detach ink particles from said wastepaper; and B. removing the detached ink particles from the deinking solution.

2. A process as in claim 1 wherein said reaction products are present in an amount of from about 0.1 to about 0.8% by weight.

3. A process as in claim 1 wherein said deinking solution also contains at least one of the following:

a) an alkali metal hydroxide, b) an alkali metal silicate, c) a soap, d) an ethoxylated fatty alcohol, e) an ethoxylated alkyl phenol, f) an oxidative bleach, g) a $C_{10-22}$ fatty acid, or h) a polymer.

4. A process as in claim 1 wherein said deinking solution also contains a) from 0 to about 2.0% by weight of 100% hydrogen peroxide, b) from 0 to about 2.5% by weight of sodium hydroxide, c) from 0 to about 4.0% by weight of sodium silicate, and d) from 0 to about 1% by weight of one or more of a $C_{10-22}$ fatty acid, an ethoxylated $C_{6-22}$ fatty alcohol, an ethoxylated alkyl phenol, and a polymer, wherein the above weights are based on the air dry weight of the wastepaper.

5. A process as in claim 1 wherein step A is carried out at a temperature of about 20° C. to about 80° C.

6. A process as in claim 1 wherein from about 1 to about 30% by weight, based on the weight of the aqueous solution, of wastepaper is present in said deinking solution.

7. A process as in claim 1 wherein said alkoxylated carbohydrate-derived polyol contains from about 40 to about 120% by weight of alkylene oxide.

8. A process as in claim 1 wherein the alkylene oxide component of said alkoxylated carbohydrate-derived polyol is selected from the group consisting of ethylene oxide, propylene oxide, and butylene oxide.

* * * * *